March 8, 1938.  F. R. BUTHERUS  2,110,415
SYNCHRONOUS ELECTRIC MOTOR
Filed Jan. 6, 1936  2 Sheets-Sheet 1
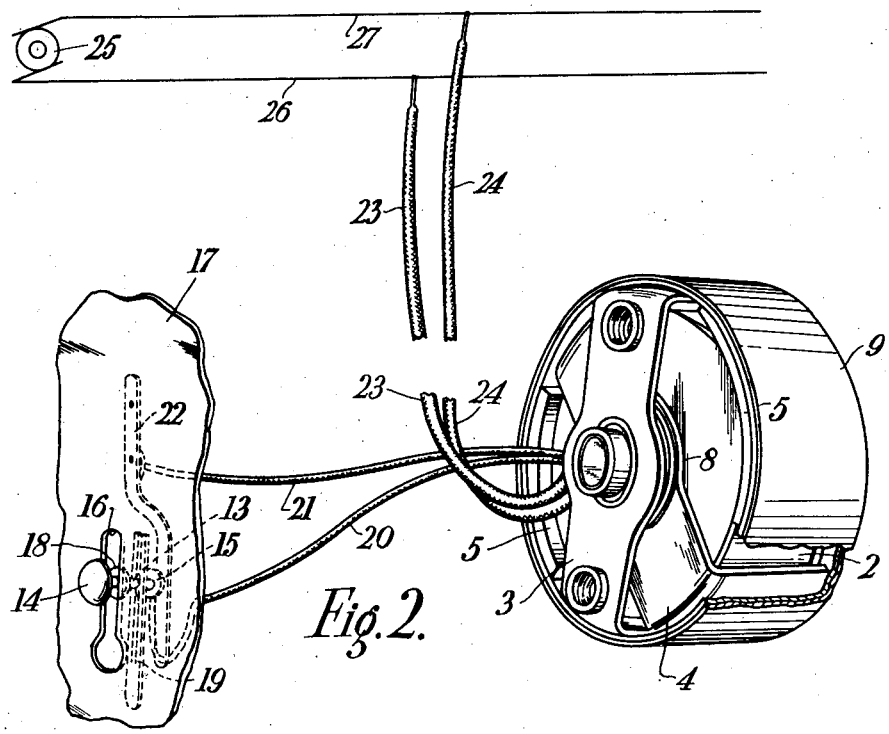
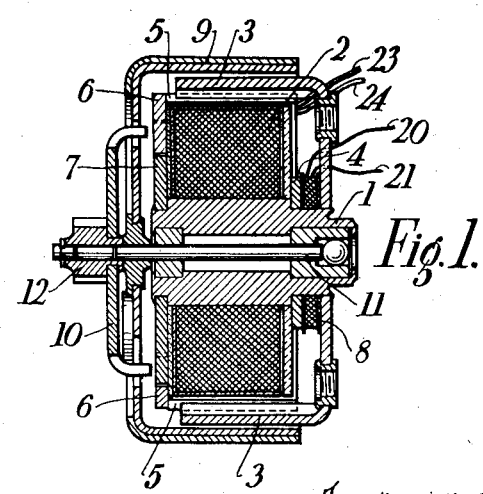
Inventor
Frederick Roy Butherus
By [signature] Attys

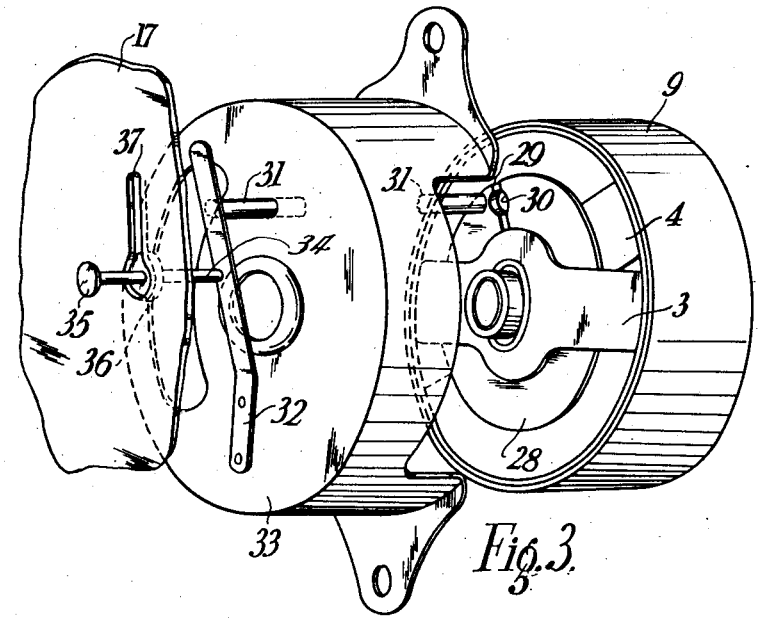
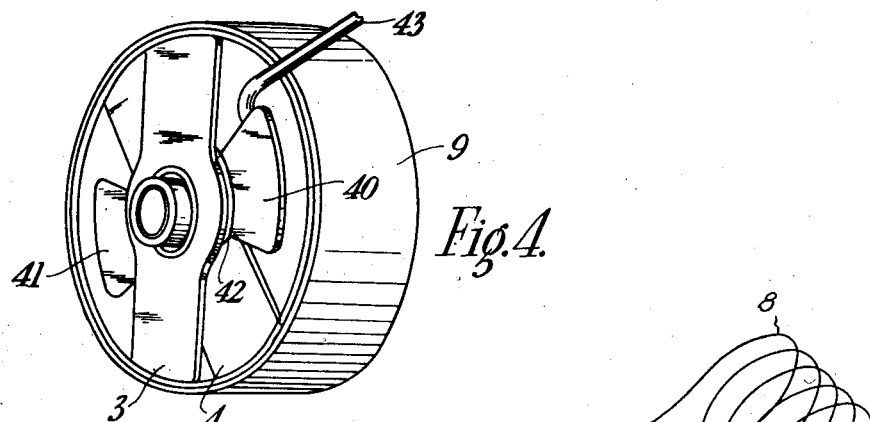
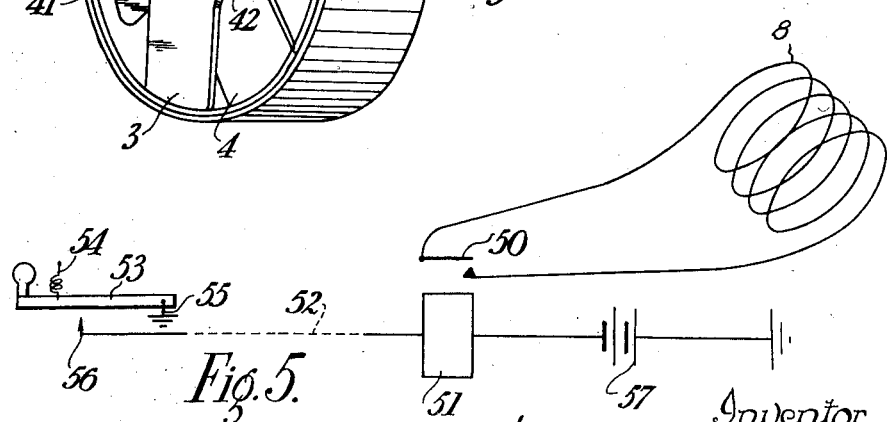

Patented Mar. 8, 1938

2,110,415

UNITED STATES PATENT OFFICE 2,110,415

SYNCHRONOUS ELECTRIC MOTOR

Frederick Roy Butherus, Enfield, England

Application January 6, 1936, Serial No. 57,748
In Great Britain January 10, 1935

12 Claims. (Cl. 172—275)

The present invention relates to electric motors and is more particularly concerned with small synchronous motors such as are employed in electric clocks, prepayment meters, time switches and like apparatus necessitating a timing mechanism.

In prepayment mechanism and time switches. It is obviously desirable that the synchronous motor should be self-starting but in electric clocks such a feature is not necessarily so desirable. Thus some users might prefer the clock to resume its time indicating function after a short interruption of current supply even though the clock will be slow while others prefer it to stop altogether giving a definite indication that there has been a current interruption.

Constructions of electric motors are known in which the current through the energizing coil gives rise to two fields, one a rotary field which acts on an induction element of the rotor and which ensures self-starting and the other an alternating field which acts on a synchronous element of the rotor to ensure synchronous running.

According to the present invention in a motor in which the production of a shifting magnetic field by single phase alternating current is dependent upon arrangements for causing polepieces to reach their maximum magnetic strength at different instants of time, means are provided whereby without disturbing the supply of alternating current the magnetic field is prevented from shifting which means consist of an arrangement for modifying the phase shifting means or of modifying the magnetic circuit.

The control of the shifting magnetic field may be effected by a manual operation on the part of the user or from a distance by an electric relay or like switching device or automatically when a switching operation is effected due to a particular event occurring or due to the elapse of a predetermined period of time.

The shifting field is obtained by causing a phase shift to occur between the alternating flux issuing from the poles of a plurality of pairs of polepieces. Such phase shift can be obtained by suitable phase-shifting means, for instance, a copper disc, sleeve or like member or a short-circuited winding. The shifting field acts on an induction element associated with the polepieces and causes the motor to start when the current is switched on.

The invention will be better understood from the following description of one embodiment taken in conjunction with the accompanying drawings in which:

Fig. 1 shows a cross sectional view through the motor,

Fig. 2 shows a perspective view of the motor as seen from the right hand side of Fig. 1, together with a suitable form of switch for effecting the conversion, Fig. 3 shows a motor employing a different method of obtaining the shifting magnetic field, together with means for annulling the field, Fig. 4 shows a further arrangement for annulling the effect of the shifting field, and Fig. 5 shows an arrangement whereby the effect of the shifting field is annulled from a distant point.

Referring now to the drawings the motor is a self-starting motor and is similar to that described in British patent specification No. 384,880 and comprises a magnetic core 1 on which is wound an energizing coil 2. The leads 23 and 24 to the energizing coil are shown diagrammatically in Fig. 2 as connected to a source of frequency-controlled alternating current supply over a pair of wires 26 and 27. Polepieces 3 and 4 extend from one end of the coil while polepieces 5 extend from the opposite end thereof.

Polepieces 5 form part of a ring 6 which is provided with inwardly projecting teeth which extend to the spaces between teeth provided on a disc 7. The two sets of interlocking teeth are separated by an air gap. The number of teeth on the members 6 and 7 are determined in accordance with the speed at which it is desired that the motor should operate in conjunction with the frequency of the alternating current supply.

When current passes through the coil 2 the flux issuing from the polepieces 3 and 4 reaches its maximum value at different instants of time due to the presence of a short-circuited coil 8 located between the two polepieces. The effect of the short-circuited coil 8 is, therefore, to give rise to a shifting magnetic field while an alternating field is set up in the air gap between the members 6 and 7. This latter field will of course alternate in synchronism with the frequency of the current supply. In the particular instance the short-circuited coil 8 comprised 12 to 14 turns of No. 30 gauge wire.

The rotor of the motor comprises a cup shaped member 9 which forms an induction element and which is acted upon by the shifting magnetic field to impart self-starting characteristics to the motor and a permanent magnet 10 forming the synchronous element which cooperates with the alternating field. Both the induction element and the synchronous element are rigidly mounted on the rotor shaft 11 and this shaft is also provided with a pin 12 which serves to drive the mechanism controlled by the motor. It will be appreciated that the shifting magnetic field will be produced only when the terminals of the coil 8 are short-circuited and hence if these terminals are disconnected, the shifting magnetic field will not be produced and the motor operates as a non-self-starting motor. The short-circuiting or disconnecting of the coil 8 can easily be effected manually by means of any known form of two position switch, that illustrated in the drawings being merely by way of example.

In the drawings the switch comprises a stud 13, provided at one end with a button 14 and at the other end with a contact disc 15, passes through a slot 16 in a fixed plate 17. The position of the plate will, of course, depend upon the purpose for which the motor is employed. Where, however, it is employed to drive an electric clock, the plate 17 could conveniently be the back plate of the clock case. It will be noted that the slot 16 is enlarged at one end to form a circular aperture which has a diameter slightly greater than that of the button 14. A collar 18 is also fixed on the stud 13 on the opposite side of the plate 17 to the button 13 and has a diameter greater than the width of the slot 16 but less than that of the circular aperture. A slotted blade spring 19 is also fixed to the plate 17 and works in a groove provided on the periphery of the stud 13. One conductor 20 connected to one terminal of the lag coil 8 terminates on the contact disc 15 while the other conductor 21 connected to the other terminal of the phase-shifting coil terminates on a spring contact member 22 fixed to the plate 17. The conductors 23 and 24 serve to connect a suitable source of supply to the energizing coil 2 of the motor.

The operation of the switch is as follows: When the stud is at the lower end of the slit it is urged by the blade spring 19 in a direction to withdraw the disc 15 from contact with the spring member 22, the collar 18 passing through the circular aperture. In this case the terminals of the phase-shifting coil 8 are disconnected and, as explained above, the motor acts as a non-self-starting motor. To start the motor, however, the button is depressed for a short period to short-circuit the terminals of the phase-shifting coil 8. When the motor has started the button is released and springs back under the action of the spring 19.

When, however, the motor is to operate as a self-starting motor, the button 14 is depressed and moved along the slot in an upward direction to a position such as that shown in the drawings. When pressure is removed from the button, the spring 19 tends to move the stud 13 in a direction to withdraw the disc 15 from the contact spring 22, but the withdrawal is prevented by the collar 18 engaging the edges of the slot 16. The terminals of the phase-shifting coil 8 are therefore short-circuited as long as the stud 13 remains in the position shown in the drawings.

Referring now to Fig. 3 of the drawings this arrangement shows the use of a copper disc 28 located between the polepieces 3 and 4 for causing the production of the shifting magnetic field. It will be understood that when current flows through the coil, circulating eddy currents are induced in the copper disc and this causes the flux issuing from the polepieces 3 and 4 to attain their maximum values at different instances of time. It will be seen, therefore, that if the disc 28 is split as shown at 29, the circulating eddy currents will not flow and the production of the shifting magnetic field will be prevented. In the arrangement shown in Fig. 3 the slot 29 is provided with an enlarged portion 30 through which a pin 31 can pass. It will be understood that when the pin 31 is in position in the enlarged portion 30, eddy currents can flow and the motor operates as a self-starting motor. When the pin 31 is removed the flux issuing from the polepieces 3 and 4 will reach the maximum value at the same instant and no shifting magnetic field will be produced. The motor, therefore, acts as a non-self-starting motor.

The insertion and withdrawal of the pin 31 can be effected by any well known form of switch, that shown in the drawings being given merely by way of example. In the construction shown the pin 31 is carried by a blade spring 32 fixed to the cover 33 of the motor. The spring 32 is arranged so that normally the pin 31 is withdrawn from the enlarged portion 30. The switching member 34 which may conveniently be attached to the back plate of the mechanism with which the motor is associated is provided with a stud 35 and a collar 36 and is arranged to operate in a slot 37.

By depressing the member 34 when in the position shown in the drawings the pin 31 will be caused to pass into the enlarged portion 30 to cause the motor to start but the pin 31 and member 34 will be returned to their original position under the action of the spring 32, as soon as the pressure is removed from the stud 35. If, however, the member 34 is moved along the slot 37 the pin 31 will be maintained in position in the enlarged portion 30 and the motor will operate as a self-starting motor.

In Fig. 4 a further arrangement is shown for preventing the production of the shifting magnetic field. In the constructions shown in Figs. 1 and 3 this object has been achieved by rendering the conducting coil 8 or the copper disc 28 effective or ineffective according as it is desired to render the motor self-starting or non-self-starting. In the arrangement according to Fig. 4 a copper disc is employed but the object is effected by magnetically connecting together the polepieces 3 and 4. The construction shown comprises two soft iron fins 40 and 41 mounted on a non-magnetic boss 42 which is capable of rotating on the copper disc as a bearing. The fins are of a thickness not greater than that of the copper disc. Attached to the fin 40 is an arm 43 which passes out through a slot in the cover of the motor.

With the fins in the position shown in the drawings, the polepieces 3 and 4 are magnetically separate and the copper disc is effective to cause the motor to act as a self-starting motor. If now by means of the arm 43 the fins are rotated so that the top side of the fin 40 engages with the underside of the polepiece 3 and the underside of the fin 40 engages with the top side of the polepiece 4 and similarly for the fin 41, the polepieces will be magnetically connected together and the copper disc will be ineffective as regards the production of the shifting magnetic field. The motor will thus operate as a non-self-starting motor.

Fig. 5 shows diagrammatically an arrangement for short-circuiting the coil 8 shown in the constructions of Figs. 1 and 2, by control from a distant point. Included in the circuit of the coil 8 is the contact 50 of a relay 51. The relay 51 is energized over a line 52 by means of a key 53. Depression of the key against the tension of the spring 54 causes earth potential applied to the pivot point 55 of the key to be applied to the line over contact 56. The relay is thereupon energized by the battery 57, the contact 50 closes and the coil 8 short-circuited. Momentary depression of the key 53, therefore, causes the motor to start.

It will be appreciated that the above embodiments have been shown merely by way of example and that other constructions all falling within the scope of the invention will be apparent to those skilled in the art.

I claim:—

1. A synchronous electric clock motor comprising means for producing a shifting magnetic field, means for producing an alternating non-shifting magnetic field, a rotor comprising a conducting element subject to said shifting magnetic field for starting purposes and a magnetic element subject to said alternating non-shifting magnetic field for maintaining said rotor at synchronous speed due to the torque exerted by said magnetic element at said synchronous speed being substantially greater than the torque exerted by said conducting element, and external controlling means for annulling and replacing the shifting magnetic field independently of the alternating non-shifting magnetic field whereby the starting of the motor may be controlled as desired without being able to affect the synchronous running of the motor once synchronous speed is attained.

2. A synchronous electric clock motor having means for producing a shifting magnetic field, means for producing a non-shifting alternating magnetic field, a rotor which is set in motion by said shifting magnetic field and when once started is maintained at a synchronous speed by said non-shifting alternating magnetic field due to the torque on said rotor created by the non-shifting magnetic field being substantially greater than the torque created by the shifting magnetic field, and external controlling means for annulling at will the effect of said shifting magnetic field independently of the non-shifting alternating magnetic field whereby the starting of the motor may be controlled as desired without being able to affect the synchronous running of the motor once synchronous speed is attained.

3. A synchronous electric clock motor having a plurality of pole pieces, a second set of pole pieces, means for energizing both said sets of pole pieces with alternating magnetic flux, means for causing the magnetic flux issuing from each of said first pole pieces to attain the maximum value at different instants of time whereby a shifting magnetic field is set up, means for energizing said second set of pole pieces to set up a non-shifting alternating magnetic field, a rotor adapted to be rotated by said shifting magnetic field, external controlling means for annulling the effect of said shifting magnetic field independently of said non-shifting alternating field whereby the motor is capable of acting as a self-starting or non-self-starting motor at will, and a synchronous element acted upon by said non-shifting alternating magnetic field for enabling the rotor when once started to continue to rotate at synchronous speed independently of said shifting magnetic field.

4. A synchronous electric clock motor comprising a core, pole pieces connected to said core, an exciting coil, a conducting circuit embracing certain of said pole pieces and not embracing other of said pole pieces to cause a magnetic field of a shifting character to be produced when said exciting coil is subjected to alternating current, a second set of pole pieces arranged to produce a non-shifting alternating field when said exciting coil is subjected to alternating current, a rotor having a conducting component subject to said shifting magnetic field and a magnetic component subject to said non-shifting alternating field, and external controlling means for annulling the shifting character of said first magnetic field at will independently of said non-shifting alternating field whereby the subsequent operation of the rotor will take place at synchronous speed.

5. A synchronous electric clock motor having means for producing a shifting magnetic field and a non-shifting magnetic field, a rotor adapted to be rotated by said shifting magnetic field, manually operated means for annulling the effect of said shifting magnetic field independently of said non-shifting magnetic field whereby the motor is capable of acting as a self-starting or non-self-starting motor at will, and a synchronous element controlled by said non-shifting magnetic field for enabling the rotor when once started to continue to rotate at synchronous speed independently of said shifting magnetic field.

6. A synchronous electric clock motor having means for producing a shifting magnetic field and a non-shifting magnetic field, a rotor adapted to be rotated by said shifting magnetic field, means operated from a distance for annulling the effect of said shifting magnetic field independently of said non-shifting magnetic field whereby the motor is capable of acting as a self-starting or non-self-starting motor at will, and a synchronous element controlled by said non-shifting magnetic field for enabling the rotor when once started to continue to rotate at synchronous speed independently of said shifting magnetic field.

7. A synchronous electric clock motor comprising a plurality of pole pieces, means for energizing said pole pieces with alternating magnetic flux, a winding comprising a plurality of turns disposed between adjacent pole pieces, means for short-circuiting the terminals of said winding to generate a shifting magnetic field, a rotor disposed to be rotated by said shifting magnetic field to provide self-starting, means for removing the short circuit of said winding whereby said shifting magnetic field is no longer generated and the motor is non-self-starting, and a synchronous element for enabling said rotor when once started to continue to rotate at a synchronous speed.

8. A synchronous electric clock motor comprising a plurality of pole pieces, means for energizing said pole pieces with alternating magnetic flux, damping means disposed between said pole pieces for generating a shifting magnetic field, a rotor disposed to be rotated by said shifting magnetic field to provide self-starting, means for magnetically short-circuiting said pole pieces whereby said shifting magnetic field is no longer generated and the motor is non-self-starting, and a synchronous element for enabling said rotor when once started to continue to rotate at a synchronous speed.

9. A synchronous electric clock motor comprising a plurality of pole pieces, means for energizing said pole pieces with alternating magnetic flux, damping means disposed between said pole pieces for generating a shifting magnetic field, a rotor disposed to be rotated by said shifting magnetic field to provide self-starting, magnetic shunt means movably disposed between said pole pieces, externally operable means for moving said shunt means relative to said pole pieces whereby said pole pieces are magnetically short-circuited and said shifting field is not generated to render the motor non-self-starting, and a synchronous element for enabling said rotor when once started to continue to rotate at a synchronous speed.

10. A synchronous electric clock motor comprising a plurality of pole pieces, means for energizing said pole pieces with alternating magnetic flux, phase-shifting means located between each of said pole pieces for causing the magnetic flux issuing from each of said pole pieces to attain the maximum value at different instants of time whereby a shifting magnetic field is set up, means for producing an alternating non-shifting magnetic field, a rotor which is set in motion by said shifting magnetic field and when once started is maintained at a synchronous speed by said alternating non-shifting magnetic field due to the torque on said rotor created by the non-shifting magnetic field at said synchronous speed being substantially greater than the torque created by the shifting magnetic field, and external controlling means for annulling at will the effect of said shifting magnetic field independently of the alternating non-shifting magnetic field whereby the starting of the motor may be controlled as desired without being able to affect the synchronous running of the motor once synchronous speed is attained.

11. A synchronous electric clock motor comprising a plurality of pole pieces, means for energizing said pole pieces with alternating magnetic flux, an electric conducting coil having at least one turn located between adjacent pole pieces, means for connecting together the ends of the coil to cause the production of a shifting magnetic field, means for producing an alternating non-shifting magnetic field, a rotor which is set in motion by said shifting magnetic field and when once started is maintained at a synchronous speed by said alternating non-shifting magnetic field due to the torque on said rotor created by the non-shifting magnetic field at said synchronous speed being substantially greater than the torque created by the shifting magnetic field, and external controlling means for disconnecting the ends of said coil whereby the production of the shifting magnetic field is prevented independently of the alternating non-shifting magnetic field and the starting of the motor may be controlled as desired without being able to affect the synchronous running of the motor once synchronous speed is attained.

12. A synchronous electric clock motor comprising a plurality of pole pieces, means for energizing said pole pieces with alternating magnetic flux, an electric conducting disc located between adjacent pole pieces to cause the production of a shifting magnetic field, means for producing an alternating non-shifting magnetic field, a rotor which is set in motion by said shifting magnetic field and when once started is maintained at a synchronous speed by said alternating non-shifting magnetic field due to the torque on said rotor created by the non-shifting magnetic field at said synchronous speed being substantially greater than the torque created by the shifting magnetic field, and external controlling means for introducing a discontinuity into said disc whereby the production of the shifting magnetic field is prevented independently of the alternating non-shifting magnetic field and the starting of the motor may be controlled as desired without being able to affect the synchronous running of the motor once synchronous speed is attained.

FREDERICK ROY BUTHERUS.